United States Patent [19]

Södergren et al.

[11] Patent Number: 4,572,159
[45] Date of Patent: Feb. 25, 1986

[54] TEMPERATURE STABILIZED SOLAR RESERVOIR

[75] Inventors: Lars-Olof Södergren, Stockholm; Conny Ryytty, Bandhagen/Stockholm, both of Sweden

[73] Assignee: RyBro Handelsbolag, Bandhagen, Sweden

[21] Appl. No.: 620,468

[22] Filed: Jun. 14, 1984

[30] Foreign Application Priority Data

Jun. 20, 1983 [SE] Sweden ............................. 8303536

[51] Int. Cl.4 ................................................ F24J 3/02
[52] U.S. Cl. .................................... 126/415; 126/400; 252/315.2
[58] Field of Search ............... 126/415, 400; 60/641.8, 60/641.13, 641.1; 210/747, 170; 252/315.2

[56] References Cited

U.S. PATENT DOCUMENTS 4,138,992  2/1979  Shaffer et al. ..................... 126/415

Primary Examiner—Randall L. Green
Attorney, Agent, or Firm—Scully, Scott, Murphy & Presser

[57] ABSTRACT

The invention relates to a temperature stabilized solar reservoir for trapping sunlight and storing solar energy in the solar reservoir itself, which includes a vessel (1) with a bed of a heat storage medium (2) provided with a gelling agent, and means (3,4,5) for extracting heat from the bed. Distinguishing for the invention is that the heat storage medium is pigmented and that the pigmentation is such that the temperature of the heat storage medium is substantially constant counted in a direction downwards towards the bottom of the reservoir. Pigmentation can be carried out in several different ways, e.g. by dissolving or suspending a dye in the heat storage medium (2) or by using pigmented layers having different colors.

22 Claims, 4 Drawing Figures

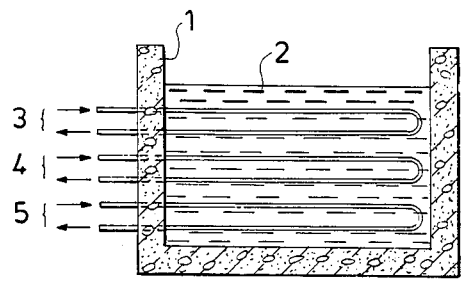
_Fig.1_
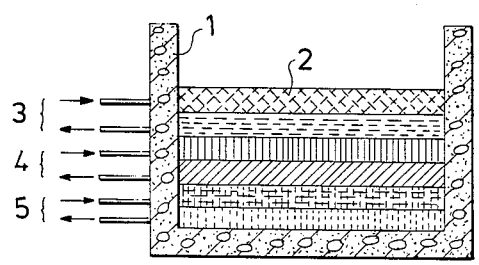
_Fig.2_
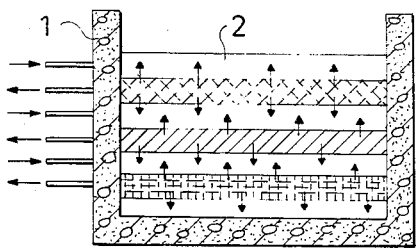
_Fig.3_
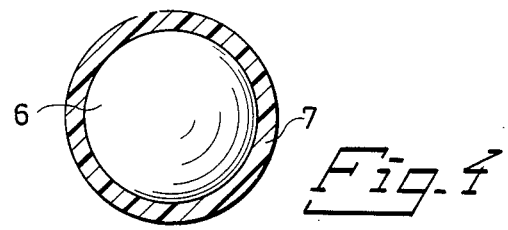
_Fig.4_

TEMPERATURE STABILIZED SOLAR RESERVOIR

The present invention relates to a temperature stabilized solar reservoir for catching sunlight and storing solar energy, and includes a vessel with a bed of a heat storage medium with a gelling agent and means for extracting heat from the bed.

It is known to catch sun-rays in a so-called solar reservoir, which comprises a vessel filled with water, which serves as a medium for catching the sunlight. In such a known solar reservoir the water surface is heated gradually while the lower bottom layers remain relatively cold. In a solar reservoir using water it is further known to use salts at the bottom of it to provide a temperature inversion. In such a reservoir the desired salt concentration gradient is destroyed by diffusion as a result of evaporation at the surface of the reservoir. In this known reservoir fresh water is therefore supplied to the surface and new saturated saline solution at the bottom.

The U.S. Pat. No. 4 138 992 describes a solar reservoir in which the water has been provided with a gelling agent, the object of which is to reduce convection currents in the water and to diminish evaporation from the water. By reason of this measure the water with its gelling agent may be compared with the glass plates which are usually arranged above conventional flat solar collectors. According to the patent mentioned, sheets of such as plastics film are arranged at different levels in the vessel. These sheets have the task of reducing the size of the convection currents. At the bottom of the solar reservoir according to the patent mentioned there is a black surface for absorbing the solar radiation. Heat is generated during the absorption. This heat is extracted from the reservoir by the underside of the black surface being passed over by air or a liquid which transports the heat to the consumer or to a separate heat store. It is alternatively proposed that the black surface is placed directly on a heat store. The solar reservoir according to the U.S. patent thus requires a separate heat storage medium.

In order that the greatest possible amount of sunlight shall impinge on the black surface in the solar reservoir in accordance with the U.S. patent, the water with its gelling agent shall be transparent for sunlight and the black surface should not be shadowed by any constructional details such as pipes for the removal of heat from the black surface.

The present invention has the object of providing a solar reservoir which catches sunlight and stores all the entrapped heat in the reservoir itself. In other words, the solar reservoir according to the present invention does not require any separate heat store.

In accordance with the invention, this is provided by the heat storage medium being pigmented and by the pigmentation being such that the temperature of the heat storage medium is substantially constant, counting in a direction downwards towards the bottom of the reservoir.

Due to the pigmentation, sunlight is absorbed at all levels in the solar reservoir, with heat thus being generated during this absorption at all levels in the reservoir. This heat is stored in the heat storage medium, usually water, which is provided with gelling agent.

The basic idea behind the invention is thus that the pigmentation shall be carried out in a manner such that each unit of the volume of the heat storage medium shall take up an equally as great amount of heat, irrespective of the depth at which the unit is in the bed. The formation of convection currents is avoided by this measure, as well as mechanical destruction of the heat storage medium with its gelling agent. Absorption of solar energy thus takes place at every level right through the depth of the bed, the entire bed thus obtaining as even a temperature as possible. Since the convection currents or convection forces are thus reduced, the mechanical load on the heat storage medium with its gelling agent is also reduced. In turn this means that the amount of gelling agent can be reduced compared with the amount used in previously known solar reservoirs.

Pigmentation of the solar reservoir can be achieved in several different ways. According to one embodiment, the heat storage medium is pigmented by a dye dissolved in it or by coloured particles. According to this embodiment of the invention the pigmentation takes place such that the concentration of the latter increases downwards towards the bottom of the reservoir. In accordance with another embodiment of the invention, pigmentation can be implemented by utilizing dyes dissolved in the heat storage medium or coloured particles of different colours and at different depths in the bed. For this purpose there are used supplementary pigments which filter out undesired wave lengths at desired depths in the bed, with the object of achieving as even a temperature distribution as possible right through the depth of the bed.

A heat exchanger in the form of piping placed at different levels in the reservoir may be used for extracting heat from it. Since the piping is laid at different levels the temperature in the direction towards the bottom of the reservoir is maintained substantially constant, thus reducing convection currents or eliminating them entirely.

Different embodiments of the invention will now be described in detail in conjunction with the accompanying drawings, on which FIG. 1 is a cross section through a solar reservoir in accordance with a first embodiment of the invention, FIG. 2 is a corresponding view through a solar reservoir in accordance with a second embodiment of the invention, FIG. 3 is a corresponding view through a solar reservoir in accordance with a third embodiment of the invention and FIG. 4 is a cross-sectional view through a spherical body used in the inventive solar reservoir.

A cross section of a solar reservoir is illustrated in FIG. 1, and includes a basin or vessel 1, e.g. of concrete or quite simply a pond excavated in the ground, which can possibly be externally insulated with an heat insulating material (not shown), e.g. cellular plastics. The vessel 1 is filled with a heat storage medium 2, in practice consisting of water but which can also contain other liquids, e.g. oil. Agents preventing the growth of algae, anti-corrosion agents and other additives can be blended with the heat storage medium.

The medium is also provided with a gelling agent for increasing its viscosity so that a gel-like mass or bed is formed. The gelling agent can consist of such as ethylene maleic anhydride, amylopectin, modified starches, methyl cellulose esters, hydroxy ethyl cellulose esters, carboxy methyl cellulose, polyvinyl alcohol, polyacrylic acid, polyacrylamide, ethylene oxide polymer or other water-soluble polymers. The gelling agent can also consist of other organic and also inorganic substances.

According to one embodiment of the invention the heat storage medium is pigmented such that the pigmentation creates a temperature in the medium which is substantially constant, counted in a direction downwards towards the bottom of the reservoir. A solar reservoir with such a substantially constant temperature is said to be temperature stabilized. In accordance with another embodiment of the invention the heat storage medium is pigmented with a dye dissolved therein or with coloured particles. In accordance with a further embodiment of the invention, pigmentation concentration is increased in a direction towards the bottom of the reservoir. Pigmentations used can be such as ink, aniline, carbon black, ochra, tungsten oxide or other well known pigmenting agents, soluble or insoluble. Ink and aniline are soluble in water whereas carbon black, ochra and tungsten oxide are not.

In accordance with the basic principles of the invention, heat extraction from the solar reservoir shall be as evenly distributed as possible in depth. Heat extraction can therefore take place with the aid of heat exchangers in the form of piping or plastic hoses placed at different depths, e.g. as is apparent from FIG. 1. Three different pipelines 3, 4, 5 are shown here, laid at three different levels. The pipelines are in communication with pumps and consumers (not shown).

FIG. 2 illustrates another embodiment of the inventive solar reservoir where coloured particles are utilized instead of a dye dissolved in the heat storage medium, these particles colouring the gel-like mass in different layers. Particles in the same layer have the same colour while particles in different layers have different colours. By selecting the colours of the particles such that the colour comprises the supplementary colour to the wave length of the sunlight desired to be absorbed at the level in question by the gel-like bed, it is possible with suitable selection of wave lengths for the different layers to obtain a bed with a temperature which is substantially constant everywhere. In the embodiment illustrated in FIG. 2 it is assumed, similar to the embodiment according to FIG. 1, that the heat extraction shall take place as uniformly as possible by arranging heat exchangers at different levels.

FIG. 3 illustrates a still further embodiment of the solar reservoir in accordance with the present invention, and here the pigmented layers are mutually spaced in depth. The three layers illustrated are pigmented either with the same dye, which is dissolved to different concentrations in the three layers, or with the aid of coloured particles of the same kind in all three layers but present in different concentrations in each of them, or by coloured particles having a different colour in each of the layers. The small arrows in FIG. 3 are intended to denote heat conduction taking place from the pigmented layers to the unpigmented layers. Such heat conduction results in temperature equalization where the temperature is substantially constant through the whole depth of the bed.

With the object of increasing the heat storage capacity of the reservoir, bodies are disposed in the heat storage medium, and these bodies are of a material having a heat capacity greater than that of the medium. Paraffin can be mentioned as an example of material for such bodies, which are carried by the gel-like bed and are suitably distributed uniformly in depth in it.

Instead of, or together with, the mentioned bodies there are also bodies of salt arranged in the heat storage medium, these bodies having a heat storage capacity per unit of volume which is greater than that of the heat storage medium at the working temperature of the reservoir. The salts may be such as glauber salt, potassium chloride hexahydrate and the like. The gel-like bed serves as a carrier for the salt bodies here as well.

In accordance with a particular embodiment of the invention these salts are present in such quantities in the heat storage medium that the water of crystallization released when the salt is dissolved is completely taken up by the gelling agent. Accordingly, when the solar reservoir is uncharged, i.e. cold, the heat storage medium consists of a dry amorphous mass. When the reservoir is charged, i.e. hot, the medium consists of a gelatinous or highly viscous liquid or gel. The great advantage with this arrangement is that when the gel is cold the gelling agent prevents the salt from forming a cohesive cake, which is otherwise a large problem in conventional salt heat stores. The presence of such cakes prevents both heat extraction and recharging.

According to yet another embodiment of the invention, the salt bodies comprise balls or spheres 6 covered by a layer or shell 7 with the task of preventing water from diffusing into the salt. An example of such a body will be seen from FIG. 4. In this case the salt may be soluble in the heat storage medium, although this is not necessary. In this case the salt is preferably glauber salt made into balls covered with a paraffin or plastic film. These balls are carried by the gel-like bed of the heat storage medium at different heights in it and in such concentration at the respective height that the temperature in the medium is depthwise substantially constant.

With the object of still further reducing deleterious convection currents in the gel-like bed according to the present invention, the bed can be mechanically stabilized with the aid of bodies inserted into it, e.g. balls or fibres of a material which is inert relative the substances incorporated in the reservoir. As examples of such materials may be mentioned glass, ceramics and teflon.

The embodiments of the invention described above can be modified in a multitude of different ways and varied within the scope of the inventive concept.

We claim:

1. A temperature stabilized solar reservoir for entrapping sunlight and storing solar energy, including a vessel (1) with a bed of a heat storage medium (2) provided with gelling agent, and means (3,4,5) for extracting heat from the bed, characterized in that the heat storage medium is pigmented and that the pigmentation is such that the temperature of the medium is substantially constant measured in a direction downwards towards the bottom of the reservoir.

2. Reservoir as claimed in claim 1, characterized in that the heat storage medium (2) is pigmented with a dye dissolved in the medium.

3. Reservoir as claimed in claim 2, characterized in that the pigmentation concentration increases in a direction downwards towards the bottom of the reservoir.

4. Reservoir as claimed in claim 2, characterized in that the dissolved dye is selected from the group comprising ink or aniline.

5. Reservoir as claimed in claim 1, characterized in that the heat storage medium is pigmented by colored particles suspended in the medium.

6. Reservoir as claimed in claim 5, characterized in that the coloured particles are selected from the group comprising carbon black, ochra and tungsten oxide.

7. Reservoir as claimed in claim 1, characterized in that said bed is a single-layer bed of said heat storage medium.

8. Reservoir as claimed in claim 1, characterized in that said bed comprises a multiple-layered bed of said heat storage medium.

9. Reservoir as claimed in claim 8, characterized in that the layers of the heat storage medium are pigmented and that said layers are spaced from each other by the interposition of unpigmented layers.

10. Reservoir as claimed in claim 8, characterized in that the layers of the heat storage medium are pigmented and that said layers are contiguous with each other.

11. Reservoir as claimed in claim 10, characterized in that the colors of an individual layer are constant and that different layers have different colors.

12. Reservoir as claimed in claim 1, characterized in that bodies of a material having a heat capacity greater than that of the heat storage medium are disposed in it.

13. Reservoir as claimed in claim 12, characterized in that said material is selected from the group comprising paraffin, plastics and glass.

14. Reservoir as claimed in claim 1, characterized in that bodies of a salt are inserted in the heat storage medium said bodies having a heat storage capacity per unit of volume which is greater than that of the medium at the working temperature of the reservoir.

15. Reservoir as claimed in claim 14, characterized in that said bodies of a salt are inserted in the heat storage medium in such an amount that when the reservoir is cold (uncharged) the medium is an amorphous mass, whereas when the reservoir is hot (uncharged) any water of crystallization produced by the salt is bound in the heat storage medium.

16. Reservoir as claimed in claim 15, characterized in that the salt is selected from the group comprising glauber salt, potassium chloride hexahydrate and magnesium chloride.

17. Reservoir as claimed in claim 14, characterized in that the salt bodies are of a material which is insoluble in the heat storage medium and are also encapsulated in a material preventing direct contact between the salt and the medium, the encapsulated salt bodies being carried by the heat storage material provided with its gelling agent.

18. Reservoir as claimed in claim 17, characterized in that the encapsulating material is paraffin.

19. Reservoir as claimed in claim 1, characterized in that the heat storage medium with its gelling agent is mechanically stabilized with the aid of bodies inserted therein, e.g. balls or fibers of a material which is inert relative to the substances included in the reservoir, the material being selected from the group comprising glass, teflon, ceramics etc.

20. Reservoir as claimed in claim 1, characterized in that the gelling agent is selected from the group consisting of ethylene maleic anhydride, amylopectin, modified starches, methyl cellulose esters, hydroxy ethyl cellulose, carboxy methyl cellulose, polyvinyl alcohol, polyacrylic acid, polyacrylamide, ethylene oxide polymer or other water-soluble polymers.

21. Reservoir as claimed in claim 1, characterized in that the heat storage medium is water.

22. Reservoir as claimed in claim 1, characterized in that said means (3, 4, 5) for extraction of heat are laid at different depths in the bed.

* * * * *